United States Patent [19]

Imoto et al.

[11] Patent Number: 4,875,445

[45] Date of Patent: Oct. 24, 1989

[54] COMBUSTION CHAMBER OF A SUB-CHAMBER TYPE INTERNAL COMBUSTION ENGINE

[75] Inventors: Koji Imoto; Mataji Tateishi; Tadao Omura, all of Nagasaki; Kunihiko Nakajima, Mukou; Motoyuki Maekawa, Kyoto; Moritake Matusyama, Kyoto; Hiroki Tamura, Kyoto, all of Japan

[73] Assignees: Mitsubishi Jukogyo Kabushiki Kaisha; Mitsubishi Jidosha Kogyo Kabushiki Kaisha, Tokyo, Japan

[21] Appl. No.: 159,942

[22] Filed: Feb. 24, 1988

[30] Foreign Application Priority Data

Mar. 13, 1987 [JP] Japan ................. 62-56916

[51] Int. Cl.4 .............................. F02B 19/18
[52] U.S. Cl. ..................................... 123/292
[58] Field of Search ......................... 123/292

[56] References Cited

U.S. PATENT DOCUMENTS 4,406,260 9/1983 Burley ................... 123/292

FOREIGN PATENT DOCUMENTS 54-106712 8/1979 Japan ................... 123/292
58-16321 2/1983 Japan .
60-131627 9/1985 Japan .
966277 10/1982 U.S.S.R. ............... 123/292

Primary Examiner—Andrew M. Dolinar
Attorney, Agent, or Firm—Wenderoth, Lind & Ponack

[57] ABSTRACT

A combustion chamber of a sub-chamber type internal combustion engine is improved so as to operate efficiently at an excellent fuel consumption with low smoke density, either upon partial loading or upon heavy loading. The combustion chamber includes a sub-chamber port communicating a main combustion chamber with a subsidiary combustion chamber formed within a cylinder head. A space portion is formed in a cylinder head member on the side of the sub-chamber port located farthest from a cylinder center line on a cross-sectional plane of the sub-chamber port defined as a plane including a center line of the subsidiary combustion chamber and the center line of a cylinder and opening into the sub-chamber port. An expansible/contractible tube is contained within the space portion. A sub-chamber port control rod is connected to the expansible/contractible tube and slidably extends into the opening of the space portion. A working substance sealingly filled into the expansible/contractible tube undergoes substantial expansion and contraction in response to temperature variations.

8 Claims, 9 Drawing Sheets

COMBUSTION CHAMBER OF A SUB-CHAMBER TYPE INTERNAL COMBUSTION ENGINE

BACKGROUND OF THE INVENTION

1. Field of the Invention:

The present invention relates to a combustion chamber of a sub-chamber type internal combustion engine.

2. Description of the Prior Art:

A combustion chamber of sub-chamber type internal combustion engine in the prior art is illustrated in FIG. 17. In this figure, a subsidiary combustion chamber 2 is formed in a cylinder head 4. As to the configuration of the subsidiary combustion chamber 2, a hemispherical upper portion combined with a frusto-conical lower portion or a circular-pillar-shaped lower portion is known, and in FIG. 17 is shown the configuration including a frusto-conical lower portion. At the subsidiary combustion chamber 2 is disposed a fuel injection valve 5 and, if necessary, a glow plug for preheating the interior of the subsidiary combustion chamber 2 upon starting of the engine. The subsidiary combustion chamber is communicated through a sub-chamber port 3 with a main combustion chamber 1 that is formed of a top surface of a piston 7, a cylinder 8 and a bottom surface of cylinder head 4. The cross-sectional area of the path through sub-chamber port 3 is constant.

In the combustion chamber of the above-described sub-chamber type internal combustion engine of the prior art, air in the main combustion chamber 11 is compressed by the piston 7 during a compression stroke upon operation of the engine, then it flows into the subsidiary combustion chamber 2 through sub-chamber port 3, and thereby a swirling air flow (S) is produced. If fuel is injected from fuel injection valve 5 along the directed of the swirling flow (S), the fuel will revolve within the subsidiary combustion chamber 2 jointly with the swirling flow (S), thus mixing of the fuel and air is effected, and the mixture is ignited and burnt. Combustion gas and unburnt fuel within the subsidiary combustion chamber 2 are ejected through the sub-chamber port 3 into the main combustion chamber and work the piston, and at the same time mixing with air in the main combustion chamber 1 and combustion are effected. In other words, the jet flow emanating from the subsidiary combustion chamber 2 will reach the cylinder wall on the opposite side of the subsidiary combustion chamber 2 with respect to the cylinder center line B—B, will collide against that wall surface, and after such collision it will be dispersed along the wall surface of the cylinder 8.

In the above-described combustion chamber of a sub-chamber type internal combustion engine of the prior art, in order to improve fuel consumption as well as starting performance upon partial loading of the engine, it is important to increase the cross-sectional area of the path through the sub-chamber port 3 to attempt to reduce thermal loss and throttling loss at the sub-chamber port. If the cross-sectional area of the sub-chamber port 3 is increased for that purpose, then upon heavy loading, the flow speed of the jet into the subsidiary combustion chamber 2 is reduced. Hence the swirling low speed and further the jet flow speed within the main combustion chamber 1 are reduced, so that mixing and combustion of fuel and air within the main and subsidiary combustion chambers is reduced, and fuel consumption as well as smoke density are deteriorated. On the other hand, if the path cross-section area of the sub-chamber port 3 is decreased in order to promote combustion and improve fuel consumption and smoke density, then the thermal loss and throttling loss at the sub-chamber port upon partial loading or upon starting are increased, as described previously, and thus fuel consumption as well as starting performance are deteriorated.

SUMMARY OF THE INVENTION:

It is therefore one object of the present invention to provide a novel combustion chamber of a sub-chamber type internal combustion engine, in which the above-mentioned shortcomings of the prior art are obviated.

Another object of the present invention is to provide a combustion chamber of a sub-chamber type internal combustion engine, wherein fuel consumption and starting performance upon partial loading of the engine are improved and also combustion upon heavy loading of the engine is improved, resulting in excellent fuel consumption and favorable smoke density.

In order to achieve the above-mentioned objects, according to one feature of the present invention, within a sub-chamber mouthpiece or within a cylinder head and a sub-chamber mouthpiece (throughout this specification and the appended claims, a sub-chamber mouthpiece and a cylinder head are defined by the term "cylinder head member") is formed a space portion which is contiguous to the sub-chamber port and opens into the sub-chamber port. Within the space portion are contained a sub-chamber port control rod and an expansible/contractible tube (hereinafter called simply "expansible tube") connected to the control rod. Within the expansible tube is sealingly filled a working substance (solid solution, solid, liquid or gas) undergoing substantial expansion and contraction in response to temperature variations, such as wax, rubber, alcohol, etc. The working substance such as wax sealingly filled into the expansible tube expands or contracts in response to changes in temperature of the sub-chamber mouthpiece and the space portion, thus changes the length of the expansible tube. As a result, the sub-chamber port control rod is actuated to control the cross-section area of the path through the sub-chamber port.

In the combustion chamber according to the present invention, owing to the above-described novel construction, upon partial loading or upon starting when the temperature of a wall of the combustion chamber (the sub-chamber mouthpiece) is low, the cross-sectional area of the sub-chamber port is increased, and thus a jet flow speed as well as s swirling flow speed within the main and subsidiary combustion chambers are suppressed. However, as loading becomes heavy, the wall temperature of the combustion chamber (the sub-chamber mouthpiece) increases, and due to expansion of the working substance, the sub-chamber port control rod projects into the sub-chamber port, resulting in reduction of the cross-sectional area of the sub-chamber port, and thereby the jet flow speed as well as the swirling flow speed within the combustion chamber are increased.

Therefore, according to the present invention, upon partial loading or upon starting when the wall temperature of the combustion chamber is low, since the cross-sectional area of the sub-chamber port is increased through the above-mentioned process, thermal loss as well as throttling loss at the sub-chamber port can be reduced. When the loading becomes heavy, since the cross-sectional area of the sub-chamber port is reduced through the above-mentioned process, gas flow speed within the main and subsidiary combustion chambers can be increased, and formation of a fuel-air mixture and combustion thereof can be promoted.

Accordingly, with the combustion chamber embodying the present invention, fuel consumption and smoke density can be reduced over an entire range of operation from a light loading condition to a heavy loading condition, and also reduction of $NO_x$ and noise in a partial loading condition, improvement of starting performance and speed-up of an engine can be realized.

The above-mentioned and other objects, features and advantages of the present invention will become more apparent by reference to the following description of preferred embodiments of the invention taken in conjunction with the accompanying drawings.

Figure 1:
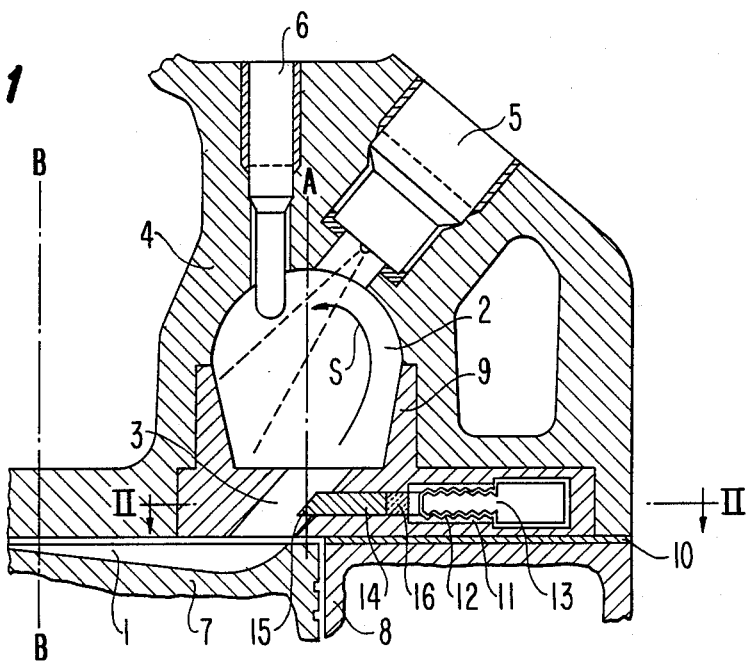
FIG. 1 is a longitudinal cross-sectional view of a first preferred embodiment of the present invention.

DESCRIPTION OF THE PREFERRED EMBODIMENTS:

A first preferred embodiment of the present invention is illustrated in FIGS. 1 to 4. In the figures, a subsidiary combustion chamber 2 is formed in a cylinder head 4. As to the configuration of the subsidiary combustion chamber 2, a hemispherical upper portion combined with a frusto-conical lower portion or a circular-pillar-shaped lower portion is employed, and in FIG. 1 is shown the configuration including a frusto-conical lower portion. At the subsidiary combustion chamber 2 is disposed a fuel injection valve 6 and, if necessary, a glow plug 6 for preheating the interior of the subsidiary combustion chamber 2 upon starting of the engine. The subsidiary combustion chamber 2 is communicated through a sub-chamber port 3 with a main combustion chamber 1 that is formed of a top surface of a piston 7, a cylinder 8 and a bottom surface of cylinder head 4.

Figure 2:
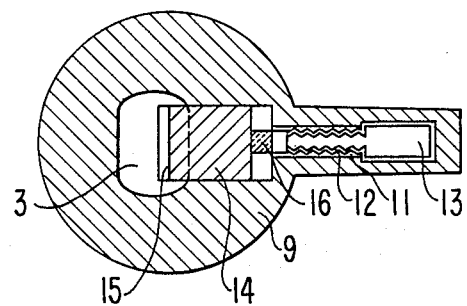
FIG. 2 is a partial transverse cross-sectional view taken along line II—II in FIG. 1 as viewed in the direction of arrows therein.
Figure 3:
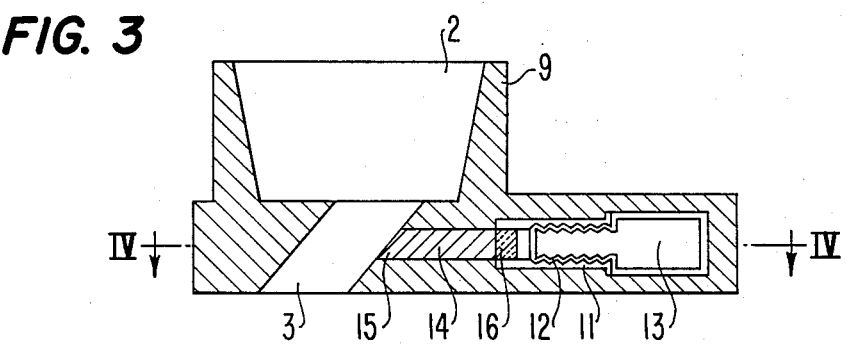
FIG. 3 is a longitudinal cross-sectional view of an essential part of the first preferred embodiment under a starting condition or under a light loading condition.
Figure 4:
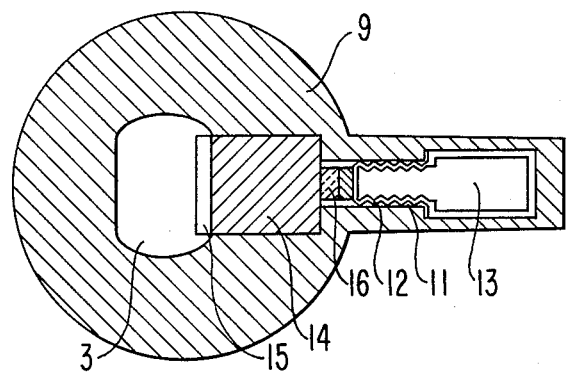
FIG. 4 is a transverse cross-sectional view of the same essential part taken along line IV—IV in FIG. 3 as viewed in the direction of arrows therein.

On a cross-section of the sub-chamber port 3 defined as a plane including a center line A—A of the subsidiary combustion chamber and a center line B—B of the cylinder, within a sub-chamber mouthpiece 9 on the side of the wall surface of the sub-chamber port located furthest from the cylinder center line B—B is formed a space portion 11 that is contiguous to the sub-chamber port 3 and opens thereat. Within space portion 11 are contained a sub-chamber port control rod 14 and an expansible tube 12 partly consisting of a bellows or the like. The sub-chamber port control rod 14 and the expansible tube 12 are connected with each other. Within the expansible tube 12 is sealingly filled a working substance (solid, liquid or mixture of solid, liquid and gas) having large expansion and contraction characteristics in response to temperature variations such as, for example, rubber, alcohol, wax, etc. A tip end portion 15 of the sub-chamber port control rod 14 can be either nearly flush with the wall surface of the sub-chamber port or can project therefrom into the sub-chamber port 3. Control rod 14 is adapted to slide along the wall surface of the space portion 11. More particularly, the working substance such as wax or the like sealingly filled within the expansible tube 12 will expand or contract in response to the temperature of the sub-chamber mouthpiece 9 and the space portion 11 via the wall of the expansible tube 12. This will cause the length of the expansible tube 12 to change according to such expansion or contraction. Accordingly, it is possible to control the path cross-sectional area of the sub-chamber port by actuating the sub-chamber port control rod 14 and its tip end portion 15. In FIGS. 3 and 4 is shown the state where the tip end portion 15 of the sub-chamber port control rod 14 is nearly flush with the wall surface of the sub-chamber port upon starting or upon light loading when the temperature of the sub-chamber mouthpiece 9 and the temperature of the space portion 11 are low, whereas in FIGS. 1 and 2 is shown the state where the tip end portion 15 of the control rod projects into the sub-chamber port 3 upon heavy loading when the temperature of the sub-chamber mouthpiece 9 and the temperature of the space portion 11 are high. If necessary, heat-insulating material is employed for a part of the sub-chamber port control rod 14.

Since the illustrated embodiment is constructed as described above, upon starting or upon light loading when the wall temperature of the combustion chamber and hence the temperature of the sub-chamber mouthpiece 9 as well as the temperature of the space portion 11 are low, the tip end portion 15 of the sub-chamber port control rod 14 is nearly flush with the inner wall surface of the sub-chamber port (FIG. 3), and thus the cross-sectional area of the sub-chamber port is large. Accordingly, during a compression stroke, the inflow speed into the subsidiary combustion chamber 2 of the gas in the main combustion chamber 1 caused by compression of the gas within the main combustion chamber 1 by the piston 7, and hence the swirling flow speed within the subsidiary combustion chamber 2, will be small, so that cooling of the fuel and thermal loss caused by the flowing of the gases are reduced. In addition, upon light loading, since the fuel injection rate is low, formation of a fuel-air mixture and combustion within the subsidiary combustion chamber 2 are insured. Also, during an expansion stroke, outflow of gas from the subsidiary combustion chamber 2 into the main combustion chamber 1 becomes easy because the cross-sectional area of the sub-chamber port is large, and hence a throttling loss at the sub-chamber port is reduced. Moreover, as the jet flow speed within the main combustion chamber 1 is low, thermal loss is also reduced.

As the load of the engine is increased, the wall temperature of the combustion chamber and hence the temperature of the sub-chamber mouthpiece 9 and the temperature of the space portion 11 will increase, the length of the expansible tube 12 will increase because of expansion of the working substance such as wax or the like filled within the expansible tube 12, and thus the tip end portion 15 of the sub-chamber port control rod 14 connected to the expansible tube 12 will project into the sub-chamber port 3 and will decrease the cross-sectional area of the path through the sub-chamber port. The heavier the loading becomes, the larger will be the extent of projection of the tip end portion 15 into the sub-chamber port 3, and the more the cross-sectional area of the sub-chamber port 3 will be decreased. Therefore, the heavier the loading upon the engine becomes, the greater will be the increase of the jet flow speed from the main combustion chamber 1 into the subsidiary combustion chamber 2 during the compression stroke, and accordingly, the greater will be the swirling flow speed within the subsidiary combustion chamber 2, to thereby promote mixing of fuel and air and their combustion. Furthermore, during an expansion stroke, the jet flow speed into the main combustion chamber 1 is also increased, hence mixing of unburnt fuel and air within the main combustion chamber is promoted, and thereby combustion is improved. On the contrary, if the loading upon the engine is reduced, the wall temperature of the combustion chamber, and hence the temperature of the sub-chamber mouthpiece 9 and the temperature of the space portion 11 are lowered. Thus, the length of the expansible tube 12 decreased because of contraction of the working substance 13 such as wax or the like within the expansible tube 12, so that the cross-sectional area of the sub-chamber port is increased, and thereby thermal loss as well as throttling loss at the sub-chamber port is reduced.

Figure 5:
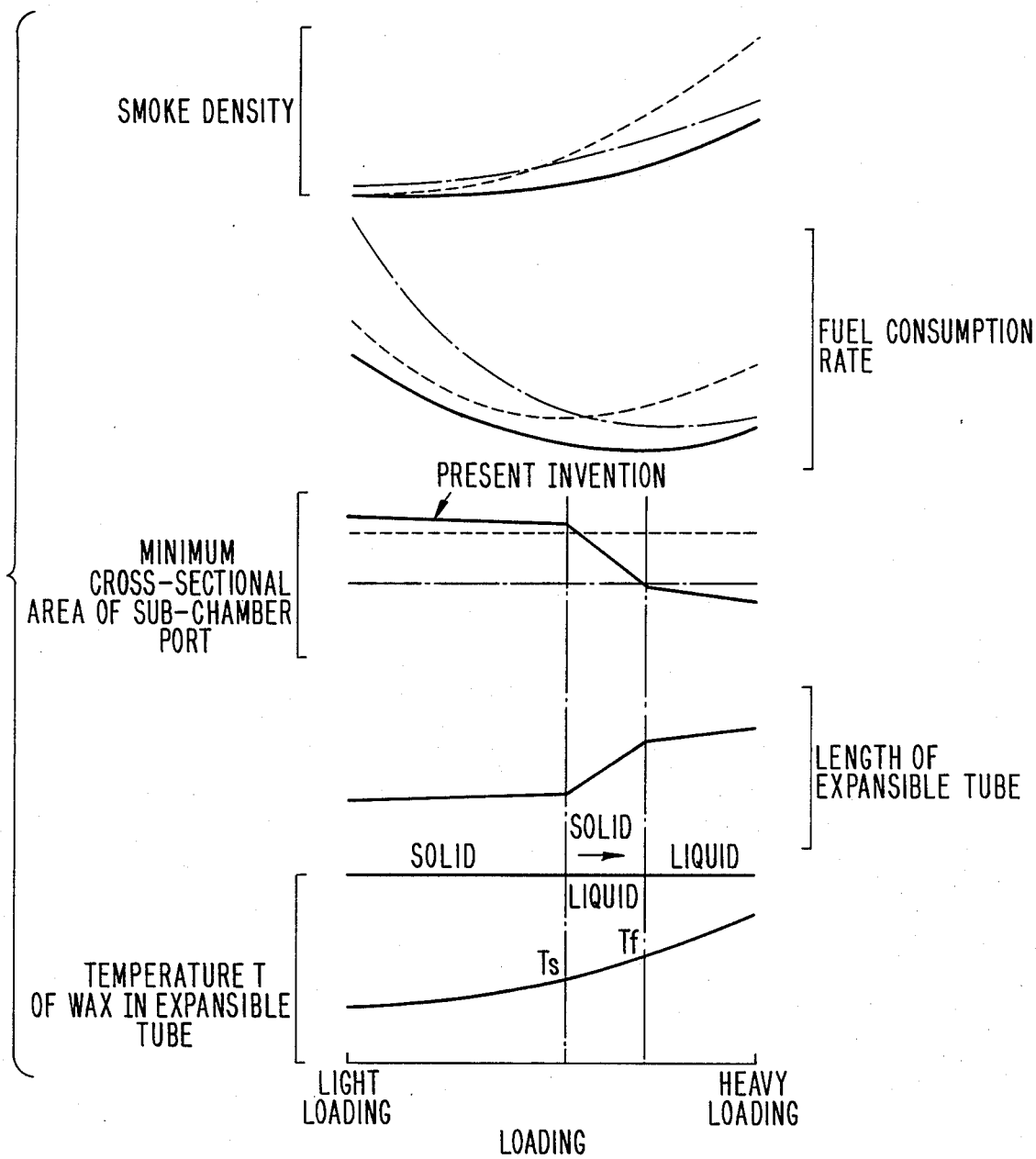
FIG. 5 is a diagram showing the effects and advantages of the first preferred embodiment.

One example of the effects and advantages of the present invention, in the case where was is employed as the working substance within the expansible tube 12, is shown in FIG. 5. Wax presents peculiar characteristics in that it is solid and its coefficient of thermal expansion is very small when its temperature T is low ($T<T_s$) ($T_s$ representing the temperature at which it begins to melt). If the was temperature T reaches a certain temperature range $T_s \leq T \leq T_f$ ($T_f$ representing the temperature at which it finishes to melt), phase transformation from solid to liquid occurs and its coefficient of thermal expansion during this period is very large. If the temperature T exceeds the temperature $T_f$ ($T>T_f$) and the wax becomes entirely liquid, its coefficient of thermal expansion becomes small. In the case of most other substances, while the coefficient of thermal expansion is successively increased as temperature is raised, it does not occur that the coefficient of thermal expansion changes greatly in accordance with phase transformation, as is the case with wax. Accordingly, if wax is employed as a working substance within the expansible tube 12, until loading becomes heavy to a certain extent (wax temperature $T<T_2$), the length of the expansible tube 12 is elongated only slightly and the cross-sectional area of the sub-chamber port is kept large, because the wax is solid and its coefficient of thermal expansion is very small. If loading upon the engine becomes heavy and the wax temperature T is within the range of $T_s \leq T \leq T_f$, then the wax is subjected to phase transformation from solid to liquid, and as its coefficient of thermal expansion becomes very large, the length of the expansible tube 2 is elongated, and the path through the sub-chamber port is throttled. If loading upon the engine is further increased and the wax temperature T becomes $T>T_f$, then the wax is entirely transformed into liquid and the coefficient of thermal expansion decreases, the length of the expansible tube 12 is further elongated only sightly, and variations of the cross-sectional area of the sub-chamber port are small with the port maintained throttled. On the contrary, if the loading upon the engine is decreased, the wax temperature decreases, and as the wax contracts, the cross-sectional area of the sub-chamber port is increased. In this connection, the force generated upon expansion or contraction of wax is very large, and can be made larger than the gas pressure within the cylinder and the frictional force exerted upon the sub-chamber port control rod 14. Thereby, smooth operation of the sub-chamber port control rod 14 is made possible.

Accordingly, in the illustrated embodiment, as shown by a solid line in FIG. 5, the minimum cross-sectional area of the sub-chamber port can be varied in response to a loading (In the apparatus of the prior art in which a sub-chamber port cross-sectional area is not varied the sub-chamber port cross-sectional area is constant as shown by a dash line or a dash-dot line in FIG. 5).

In addition, owing to the above-mentioned features, the fuel consumption rate as well as smoke density are also improved compared to the apparatus of the prior art, also as shown in FIG. 5.

When alcohol is employed in place of the above-mentioned wax, phase transformation from liquid to gas is effected, and as in the above-mentioned example, upon such phase transformation the rate of change of the coefficient of thermal expansion is very large.

As will be apparent from the above description, in the illustrated embodiment, upon light loading of the engine, since the sub-chamber port path cross-sectional area can be enlarged, thermal loss in the combustion chamber and throttling loss of the sub-chamber port are reduced, and thus fuel consumption as well as smoke density can be decreased. If the loading becomes heavy, the sub-chamber port path cross-sectional area becomes small, hence mixing of fuel and air as well as combustion in the main and subsidiary combustion chambers are promoted, and thereby fuel consumption and smoke density can be reduced.

In addition, on the cross-sectional plane of the sub-chamber port passageway defined as a plane including the center line A—A of the subsidiary combustion chamber and the center line B—B of the cylinder, the temperature of the sub-chamber mouthpiece 9 on the side of the sub-chamber port wall located farthest from the cylinder center line B—B is considerably low compared to the temperature of the sub-chamber mouthpiece 9 on the side of the sub-chamber port wall located on the side of the cylinder center line B—B, so that excessive temperature rise of the working substance in the expansible tube 12 can be avoided, and thus durability of the apparatus can be insured. Furthermore, if heat-insulating material 16 is used in the sub-chamber port control rod 14, heat flow propagating from the combustion chamber through the sub-chamber port control rod 14 can be suppressed, and excessive temperature rise of the working substance in the expansible tube 12 can be avoided.

For the above-mentioned reasons, if the combustion chamber according to the present invention is employed, then from the enter loading range up to a light loading region, fuel consumption as well as smoke density can be reduced, and moreover reduction of $NO_x$ and noise, improvement of starting performance, and speed-up of an engine in a partial loading region can be achieved.

Figure 6:
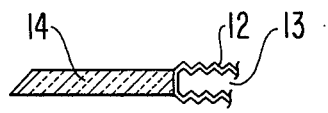
FIGS. 6 to 9 are longitudinal cross-sectional views respectively showing essential parts of second to fifth preferred embodiments of the present invention.

A second preferred embodiment of the present invention is illustrated in FIG. 6. The only difference between this embodiment and the above-described first preferred embodiment is that the entire sub-chamber port control rod 14 in the second preferred embodiment is made of heat-insulating material.

While the effects and advantages of this embodiment are almost similar to those of the above-described first preferred embodiment, as heat flow propagating from the combustion chamber through the sub-chamber port control rod 14 can be further suppressed, excessive temperature rise of the working substance in the expansible tube 12 can be more surely avoided.

Figure 7:
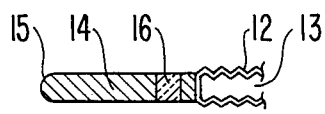

A third preferred embodiment of the present invention is illustrated in FIG. 7.

This embodiment is a modification of the first preferred embodiment in that the shape of the tip end portion 15 of the sub-chamber port control rod 14 is changed from an edge shape into a semi-circular shape or a shape having rounded corners as viewed in cross-section. While the effects and advantages of this modified embodiment are almost similar to those of the first preferred embodiment, increased smoothness of the flow through the sub-chamber port 3 as well as improvement in durability of the tip end portion 15 of the control rod 14 can be achieved.

With regard to the above-described second preferred embodiment, a modified shape of the tip end portion 15 of the control rod 14 similar to the third preferred embodiment also can be employed.

Figure 8:
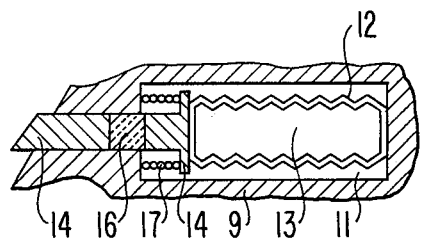

A fourth preferred embodiment of the present invention is illustrated in FIG. 8. In contrast to the fact that in the first preferred embodiment the expansible tube 12 is partly composed of a bellows, in this embodiment the entire expansible tube 12 is composed of a bellows. In addition, as shown in FIG. 8, for the purpose of positioning of the expansible tube 12 as well as the sub-chamber port control rod 14, a spring 17 or the like is disposed within the space portion 11 between a space portion side wall of the port mouthpiece 9 and a flange 14' provided at one end of the sub-chamber port control rod 14. The effects and advantages of this preferred embodiment are almost similar to those of the first preferred embodiment.

In the second and third preferred embodiments also, a similar structure to this embodiment can be employed.

Figure 9:
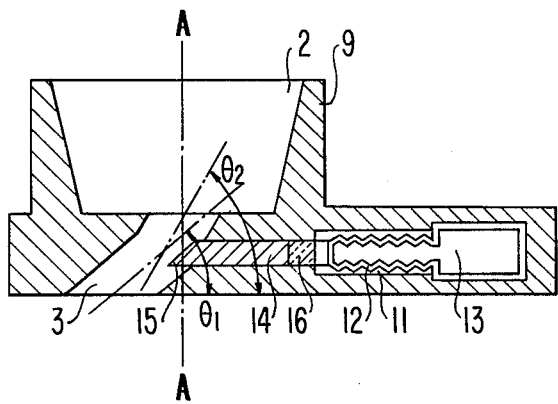

A fifth preferred embodiment of the present invention is illustrated in FIG. 9.

This embodiment differs from the first preferred embodiment in that, in contrast to the fact that in the first preferred embodiment the inclination angle $\Theta$ of the axis of the sub-chamber port 3 is constant, in this preferred embodiment, representing an angle of outflow of the axis of the sub-chamber port at an opening end on the side of the subsidiary combustion chamber with respect to a plane perpendicular to the center line A—A of the sudsidiary combustion chamber by $\Theta_2$ and representing an angle of outflow of the axis of the sub-chamber port at an opening end on the side of the main combustion chamber with respect to the plane perpendicular to the center line A—A of the subsidiary combustion chamber by $\Theta_1$, a relation of $\Theta_1 < \Theta_2$ is realized by forming the above-mentioned axis of the sub-chamber port by a combination of a straight line or lines and a circular arc or by a combination of straight lines.

The effects and advantages of this preferred embodiment are almost similar to those of the first preferred embodiment. Additionally however, as outflow angle $\Theta_2$ of the axis of the sub-chamber port at the opening end on the side of the subsidiary combustion chamber is relatively large ($\Theta_2 > \Theta_1$), during an expansion stroke, outflow of gas from the subsidiary combustion chamber 2 to the main combustion chamber 1 is relatively easy (the flow rate factor at the sub-chamber port being large), and hence throttling loss of the sub-chamber port is further reduced. Moreover, as the above-mentioned outflow angle $\Theta_1$ is relatively small ($\Theta_1 < \Theta_2$), a jet penetration within the main combustion chamber 1 is large, mixing between unburnt fuel and air as well as combustion are promoted, and thus fuel consumption and smoke density are both improved further.

A similar structure can be employed in the second to fourth preferred embodiments.

Figure 10:
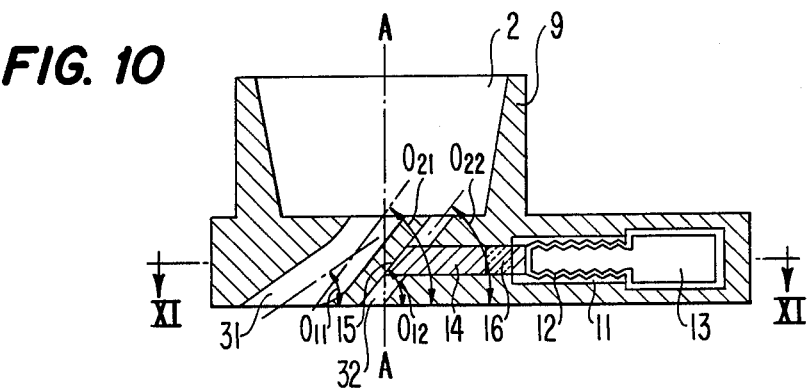
FIG. 10 is a longitudinal cross-sectional view of an essential part of a sixth preferred embodiment of the present invention.
Figure 11:
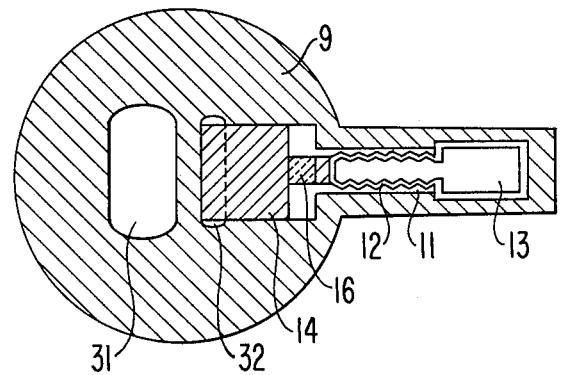
FIG. 11 is a transverse cross-sectional view of the same essential part taken along line XI—XI in FIG. 10 as viewed in the direction of arrows therein.

A sixth preferred embodiment of the present invention is illustrated in FIGS. 10 and 11.

This embodiment is a modification to the first or fifth preferred embodiments in that the sub-chamber port is provided with multiple axes. FIGS. 10 and 11 show the case where two ports are provided, and a subsidiary port 32 is disposed on the side of a main port 31 farthest from the cylinder center line B—B. On a cross-sectional plane of the subsidiary port 32 defined as a plane including the center line A—A of the subsidiary combustion chamber and the center line B—B of the cylinder, within sub-chamber mouthpiece 9 on the side of the subsidiary port located farthest from the cylinder center line B—B are disposed space portion 11, sub-chamber port control rod 14 and expansible tube 12 having wax or the like sealingly filled therein. Thereby, the cross-sectional area of a path through the subsidiary port 32 is controlled. When the outflow angle of the axis of the sub-chamber port at the opening end on the side of the subsidiary combustion chamber with respect to a plane perpendicular to the center line A—A of the subsidiary combustion chamber is represented by $\Theta_{21}$ for the main port 31 and is represented by $\Theta_{22}$ for the subsidiary port 32, and an outflow angle of the axis of the sub-chamber port at the opening end on the side of the main combustion chamber with respect to such plane perpendicular to the center line A—A of the subsidiary combustion chamber is represented by $\Theta_{11}$ for the main port 31 and represented by $\Theta_{12}$ for the subsidiary port 32, a relation of $\Theta_{11} \leq \Theta_{21}$, $\Theta_{12} \leq \Theta_{22}$ is defined by forming each of the above-mentioned axes of the sub-chamber ports by a combination of a straight line or lines and a circular arc or by a combination of straight lines.

While the effects and advantages of this embodiment are almost similar to those of the first or fifth preferred embodiments, in this preferred embodiment since the sub-chamber port control rod 14 moves into and out of the subsidiary port 32 to control only the cross-sectional area of the subsidiary port, the control rod 14 does not disturb the flow in the main port 31. Accordingly, mixing between fuel and air and their combustion in the main and subsidiary combustion chambers will be further improved.

In this preferred embodiment, the expansible tubes and the port control rods in the second to fourth preferred embodiments can be employed.

Figure 12:
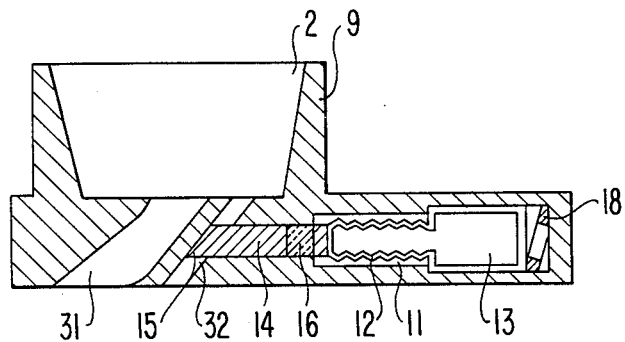
FIG. 12 is a longitudinal cross-sectional view of an essential part of a seventh preferred embodiment of the present invention under a heavy loading condition.
Figure 13:
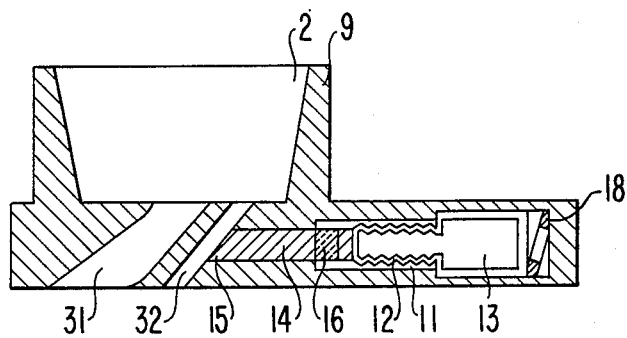
FIG. 13 is a longitudinal cross-sectional view of the same essential part but under a starting condition or under a light loading condition.

A seventh preferred embodiment of the present invention is illustrated in FIGS. 12 and 13.

This embodiment is a modification to the sixth preferred embodiment in that within the space portion 11 in the sub-chamber mouthpiece 9, at the end surface of the expansible tube 12, on the end thereof opposite to the sub-chamber port control rod 14, is disposed an expansible/contractible member 18 such as a spring washer or a spring. Member 18 is held in contact with such end surface of the expansible tube 12 and with an end wall of the space portion 11. The effects and advantages of this preferred embodiment are almost similar to those of the sixth preferred embodiment. Additionally however, after the tip end portion 15 of the sub-chamber port control rod 14 has come into contact with a partition wall existing between the subsidiary port 32 and the main port 31 due to temperature rise of the working substance such as wax or the like, if the temperature of the working substance such as wax or the like should rise further and the working substance should expand further, a large force would be exerted between the tip end portion 15 of the sub-chamber port control rod 14 and the above-mentioned partition wall and damage thereto could occur. However, according to this modified embodiment, such damage can be prevented by making the expansible/contractible member 18 absorb the displacement of the free end of the expansible tube 12. For instance, in the case where the apparatus is present in such manner that upon low-speed heavy loading, the tip end portion 15 of the sub-chamber port control rod 14 will come into contact with the above-described partition wall, upon high-speed heavy loading the wall temperature of the combustion chamber and accordingly the temperature of the working substance such as wax or the like will rise further and the above-described unfavorable damage would result unless the member 18 is provided. However, the above-mentioned damage can be prevented by the expansible/contractible member 18 according to this preferred embodiment. Moreover, according to this embodiment, setting of the expansible tube 12 within the sub-chamber mouthpiece 9 is facilitated, and damage to the expansible tube 12 and/or the sub-chamber mouthpiece 9 also can be prevented.

Figure 14:
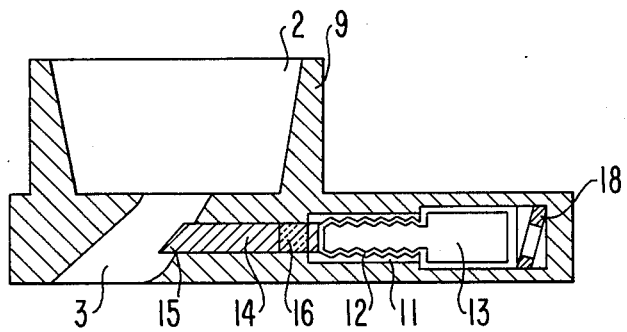
FIG. 14 is a longitudinal cross-sectional view of an essential part of an eighth preferred embodiment of the present invention.

An eighth preferred embodiment of the present invention is illustrated in FIG. 14.

This preferred embodiment is a modification of the first or fifth preferred embodiments (the embodiment having a single sub-chamber port) in that within the space portion in the sub-chamber mouthpiece 9, at the end surface of the expansible tube 12, on the end thereof surface opposite to the sub-chamber port control rod 14, is disposed an expansible contractible member 18 such as a spring washer or a spring. Member 18 is held in contact with such end surface of the expansible tube 12 and an end wall of the space portion. While the effects and advantages of this embodiment are almost similar to those of the first or fifth preferred embodiments, setting of the expansible tube 12 within the sub-chamber mouthpiece 9 is facilitated, and damage to the expansible tube 12 and/or the sub-chamber mouthpiece 9 can be prevented.

A similar structure can be employed in the second to fourth preferred embodiments.

Figure 15:
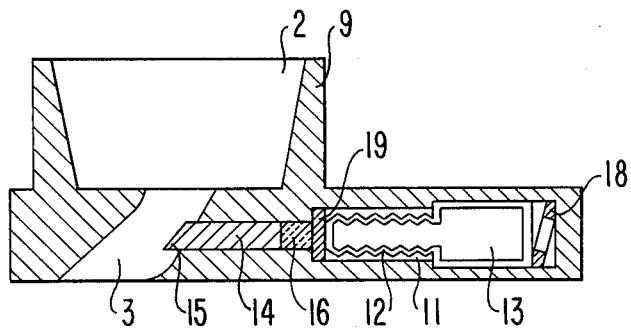
FIG. 15 is a longitudinal cross-sectional view of an essential part of a ninth preferred embodiment of the present invention.
Figure 16:
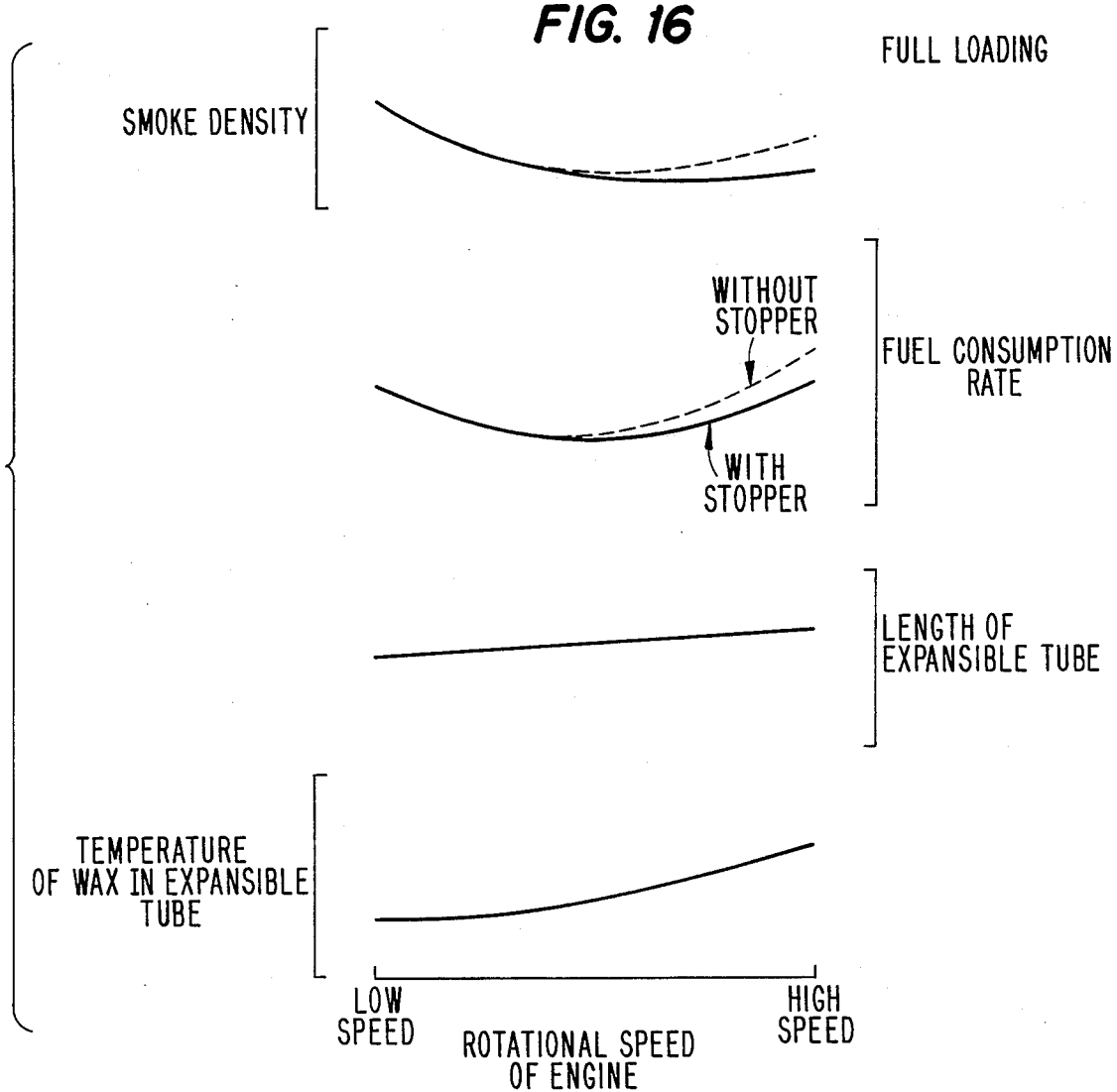
FIG. 16 is a diagram showing the effects and advantages of the ninth preferred embodiment of the present invention.
Figure 17:
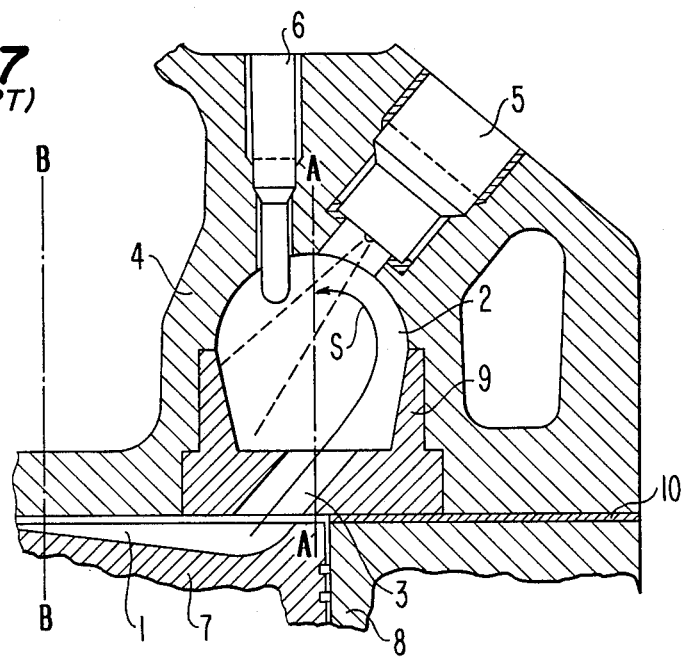
FIG. 17 is a longitudinal cross-sectional view of a combustion chamber of a sub-chamber type internal combustion engine in the prior art.

A ninth preferred embodiment of the present invention is illustrated in FIGS. 15 and 16.

This embodiment is a modification of the seventh or eighth preferred embodiments in that at the end surface of the expansible tube 12, on the end thereof on the side of the sub-chamber port control rod 14, or on the end surface of the sub-chamber port control rod 14, on the side of the expansible tube 12, is disposed a stopper 19 for restricting the maximum amount of projection of the sub-chamber port control rod 14 into the sub-chamber port 3.

The effects and advantages of this embodiment are almost similar to those of the seventh and eighth preferred embodiments. Also, even when the temperature of the working substance such as wax or the like is raised and the length of the expansible tube 12 is increased, due to provision of the above-described stopper 19 and the expansible/contractible member 18, the cross-sectional area of the sub-chamber port is not varied by more than a certain extent. One example of this effect and advantage is shown in FIG. 16. Under a full loading condition, if the rotational speed of the engine is raised, the wall temperature of the combustion chamber, hence the temperature of the sub-chamber mouthpiece 9 and the temperature of the space portion 11 will rise, and thus the temperature of the wax within the expansible tube 12 rises and the was expands. Therefore, the length of the expansible tube 12 increases. However, after the stopper 19 has engaged with the side wall of the space portion 11, the sub-chamber port control rod 14 is prevented from moving further in the leftward direction, as viewed in FIG. 15, by the stopper 19. In the event that the stopper 19 is not provided, as the rotational speed of the engine rises, the cross-sectional area of the sub-chamber port is decreased, and in the high rotational speed region, the sub-chamber port is excessively throttled. However, if the stopper 19 and the expansible/contractible member 18 are provided according to this preferred embodiment, after the stopper 19 has engaged with the side wall of the space portion, the cross-sectional area of the sub-chamber port is not varied further. Thereby, thermal loss as well as throttling loss at the sub-chamber port are reduced, and thus fuel consumption and smoke density are improved.

In FIG. 16, the results obtained in the case of this preferred embodiment incorporating the stopper are shown by solid lines, but the results obtained in the case of employing a port control rod not incorporating the stopper and an expansible tube are shown by dash lines. As will be seen from FIG. 16, according to this preferred embodiment, fuel consumption and smoke density are further improved compared with the case where the stopper is not provided.

It is to be noted that while the space portion is provided within the sub-chamber mouthpiece in the above-described respective embodiments, the invention is not limited to such location, and it is also possible to provide the space portion within the sub-chamber mouthpiece and the cylinder head in combination. In other words, the space portion is provided within the "cylinder head member" as defined previously.

As described in detail above, according to the present invention, upon starting and upon partial loading when the wall temperature of the combustion chamber and hence the temperature of the working substance such as wax or the like are low, since the cross-sectional area of the sub-chamber port is relatively large, thermal loss as well as throttling loss at the sub-chamber port can be reduced.

What is claimed is:

1. A combustion chamber of a sub-chamber type internal combustion engine, comprising:
   a sub-chamber port communicating a main combustion chamber with a subsidiary combustion chamber formed within a cylinder head;
   a space portion formed in a cylinder head member on a side of a sub-chamber port wall located farthest from a cylinder center line on a cross-sectional plane of said sub-chamber port defined as a plane including a center line of the subsidiary combustion chamber and a center line of a cylinder, said space portion opening into said sub-chamber port;
   an expansible/contractible tube contained within said space portion;
   a sub-chamber port control rod connected to said expansible/contractible tube and slidably extending into said space portion; and
   a working substance sealingly filled into said expansible/contractible tube and having the characteristic of undergoing large expansion and contraction in response to temperature variations.

2. A combustion chamber of a sub-chamber type internal combustion engine as claimed in claim 1, wherein a part or whole of said sub-chamber port control rod is made of heat-insulating material.

3. A combustion chamber of a sub-chamber type internal combustion engine as claimed in claim 1, wherein a part or whole of said expansible/contractible tube is formed of a bellows.

4. A combustion chamber of a sub-chamber type internal combustion engine as claimed in claim 1, wherein said sub-chamber port includes a sub-chamber main port and a sub-chamber subsidiary port, said subsidiary port is disposed farther from said cylinder center line than said main port, said space portion opens into said subsidiary port and is formed in said cylinder head member on the side of a subsidiary port wall located farthest from the cylinder center line on a cross-section plane of said subsidiary port defined as said plane including said center line of the subsidiary combustion chamber and said center line of a cylinder.

5. A combustion chamber of a sub-chamber type internal combustion engine as claimed in claim 4, where axes of said main port and of said subsidiary port each are formed of a combination of straight lines and a circular arc or straight lines only, and each of an outflow angle $\Theta_{21}$ of said axis of said main port and an outflow angle $\Theta_{22}$ of said axis of said sudsidiary port, at opening ends on the side of the subsidiary combustion chamber of said axes of said ports, with respect to a plane perpendicular to said center line of the subsidiary combustion chamber, and each of an outflow angle $\Theta_{11}$ of said axis of said main port and an outflow angle $\Theta_{12}$ of said axis of said subsidiary port, at opening ends on the side of the main combustion chamber of said axes of said ports, with respect to said plane perpendicular to said center line of the subsidiary combustion chamber, are selected so as to fulfil the relationships of $\Theta_{11} \leqq \Theta_{21} \leqq$ and $\Theta_{12} \Theta_{22}$.

6. A combustion chamber of a sub-chamber type internal combustion engine as claimed in claim 1, wherein an expansible member such as a spring washer, a spring or the like is disposed at an end surface of said expansible/contractible tube on a side thereof opposite to said sub-chamber port control rod.

7. A combustion chamber of a sub-chamber type internal combustion engine as claimed in claim 1, wherein an axis of said sub-chamber port is formed of a combination of straight lines and a circular arc or straight lines only, and an outflow angle $\Theta_2$ at an opening end of the side of the subsidiary combustion chamber of said axis of said sub-chamber port with respect to a plane perpendicular to said center line of the subsidiary combustion chamber, and an outflow angle $\Theta_1$ at an opening end on the side of the main combustion chamber of said axis of said sub-chamber port with respect to said plane perpendicular to said center line of the subsidiary combustion chamber selected so as to fulfil the relationship of $\Theta_1 \leqq \Theta_2$.

8. A combustion chamber of a sub-chamber type internal combustion engine as claimed in claim 1, further comprising a stopper, positioned at an end surface of said expansible/contractible tube at the end thereof on the side of said sub-chamber port control rod, or at an end surface of said sub-chamber port control rod at the end thereof on the side of said expansible/contractible tube, for restricting the maximum projecting stroke into said sub-chamber port of said sub-chamber port control rod.

* * * * *